United States Patent

Schiler

[11] 3,823,482
[45] July 16, 1974

[54] INSPECTION MACHINE HAVING RIGHT ANGLE PROBE UNITS

[75] Inventor: Frederick S. Schiler, Stow, Ohio

[73] Assignee: Portage Machine Company, Akron, Ohio

[22] Filed: June 19, 1972

[21] Appl. No.: 264,005

[52] U.S. Cl............ 33/169 R, 33/169 C, 33/174 Q
[51] Int. Cl.......................... G01b 3/22, G01b 5/00
[58] Field of Search.......... 33/169 C, 172 D, 178 R, 33/169 R, 174 R, 174 Q

[56] References Cited
UNITED STATES PATENTS
3,129,512   4/1964   Schiler............................. 33/174 R
3,279,079   10/1966  Schiler............................. 33/169 R
3,678,584   7/1972   Dolan.............................. 33/169 R Primary Examiner—Louis R. Prince
Assistant Examiner—Richard R. Stearns
Attorney, Agent, or Firm—Freeman & Taylor

[57] ABSTRACT

An inspection machine of the type set forth in Applicant's prior U.S. Pat. No. 3,279,079 further characterized by the provision of a second probing head adapted to perform at the outboard end of the inspection arm at right angles to the first probing arm whereby at least two surfaces can be checked without moving the work piece. Operation after setting is remote from the point of inspection.

3 Claims, 5 Drawing Figures

INSPECTION MACHINE HAVING RIGHT ANGLE PROBE UNITS

RELATED APPLICATIONS

None.

BACKGROUND OF THE INVENTION

A. Field of the Invention

This invention relates to the art of precision inspection and particularly relates to a machine adapted to check the accuracy of hole centers on a casting and to measure from point to point.

B. Description of the Prior Art

The most pertinent prior art is believed to be Applicant's prior U.S. Pat. No. 3,279,079 granted Oct. 18, 1966, and showing an inspection machine that is characterized by the use of a generally movable column that carries an inspection arm that is provided with a probing unit at its remote end. The probing unit is rotated around its axis remotely and is further remotely adjustable from a remote position. Movement along the X, Y, and Z axes can be achieved with the unit of the type shown in the aforesaid U.S. patent.

Applicant is also aware of the following additional prior art:

| | |
|---|---|
| DeLeeuw | U.S. Pat. No. 1,416,694 |
| Walter | U.S. Pat. No. 2,354,414 |
| Balk | U.S. Pat. No. 2,359,018 |
| Collins | U.S. Pat. No. 2,456,383 |
| Harra | U.S. Pat. No. 2,724,185 |
| Oliva | U.S. Pat. No. 2,770,045 |
| Kampmeier | U.S. Pat. No. 3,097,568 |
| Cannon | U.S. Pat. No. 3,100,346 |

British Pat. No. 915,226

SUMMARY OF THE INVENTION

While the probing unit of the aforesaid U.S. patent has been commercially successful to a great degree, it has been found that the efficiency thereof can be enhanced by providing a second probing head that will also work on the X, Y, and Z axes so that two different planes that are at right angles to each other can be inspected without movement of the work piece.

It has also been found that provision of such a second probing head permits a rotational capability 90° to the normal axis of the inspection arm to be obtained. In Applicant's patent referred to above, of course, there is disclosed means for rotating the first probe head, and it has been discovered that by appropriate gearing the second probe head can be rotated by this same mechanism.

Furthermore, it has been discovered that vertical linearity can be obtained on the second probe head by providing adjustment means to assure that the probe will project in a true vertical condition.

Production of an improved inspection machine having the above characteristics accordingly becomes the principal object of this invention, with other objects of the invention becoming more apparent upon a reading of the following brief specification, considered and interpreted in view of the accompanying drawings.

OF THE DRAWINGS

DESCRIPTION OF THE PREFERRED EMBODIMENT

Figure 1:
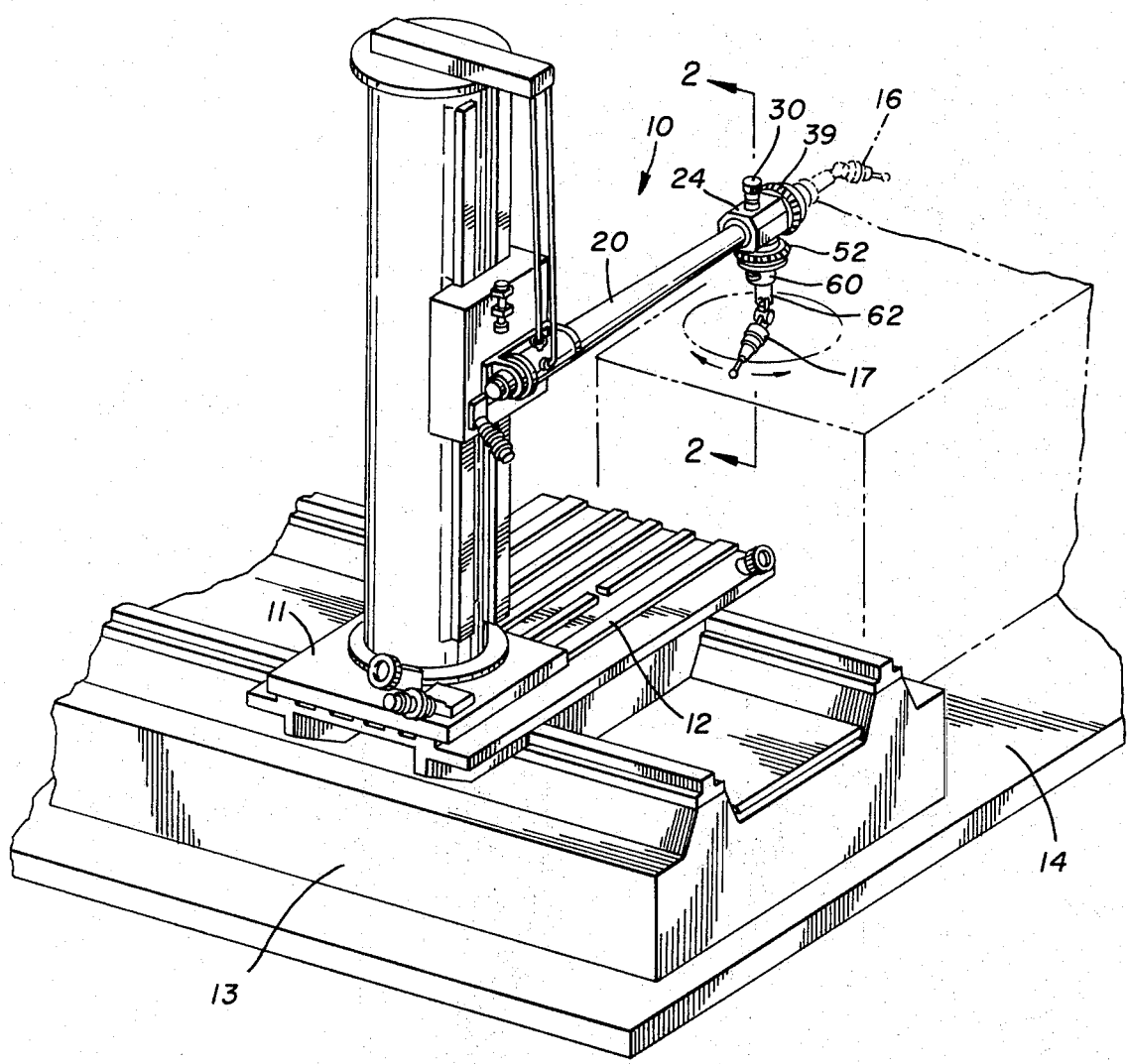
FIG. 1 is a perspective view of the improved inspection unit.

Referring now to the drawings and in particular to FIG. 1 thereof, the improved inspection machine, generally indicated by the numeral 10, includes an inspection machine 11 that is adapted to drive along a guideway 12 that is provided on the surface of the work table 13, with the work being positioned on a support member 14 as clearly shown in FIG. 1 of the drawings.

A first probe unit 16 and a second probe unit 17 are provided on the distal end of the probe arm 20 for inspection purposes in planes that are at right angles to each other, for example.

Figure 2:
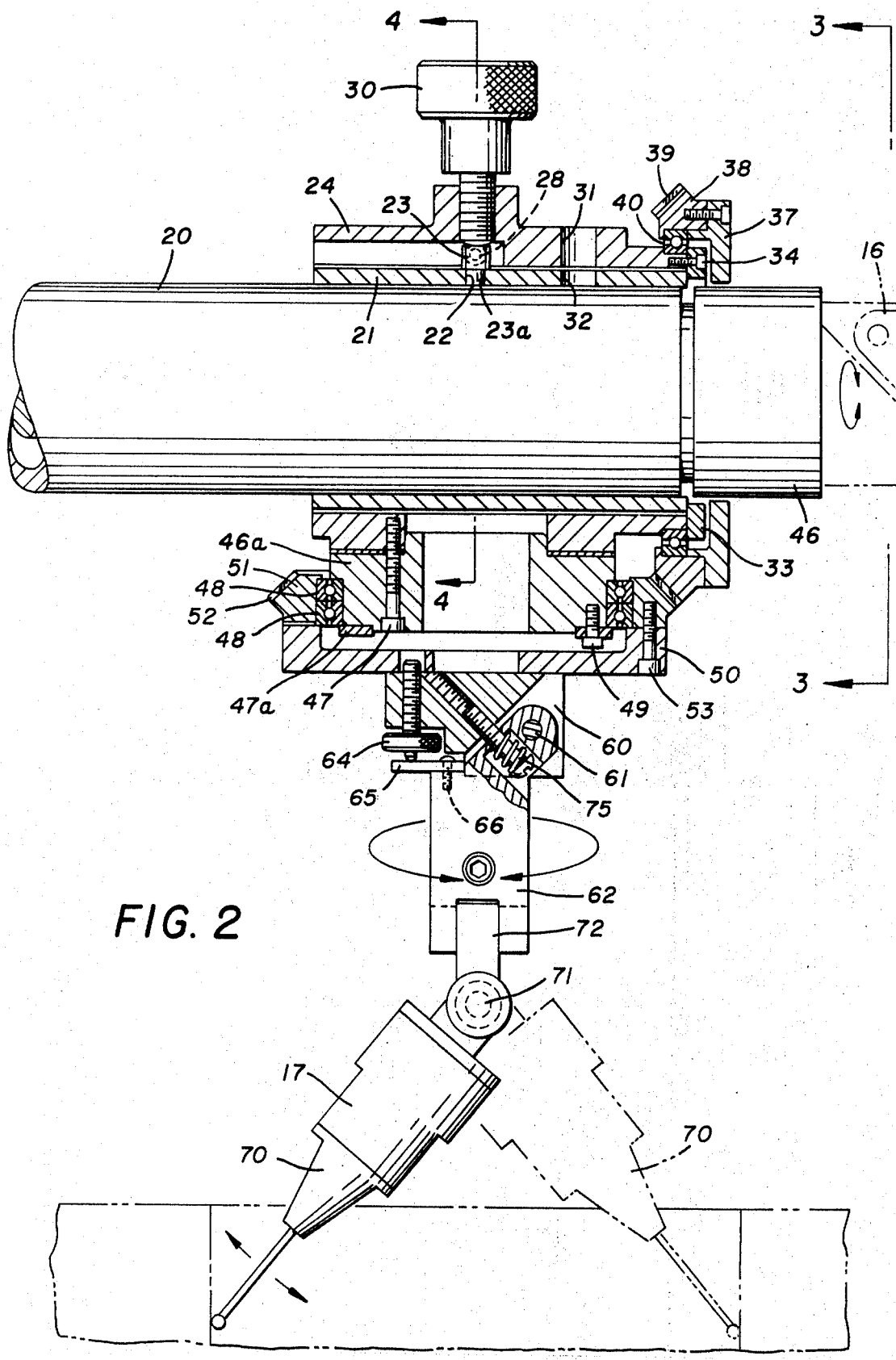
FIG. 2 is a sectional view showing the detailed construction of the second right angle probe.
Figure 3:
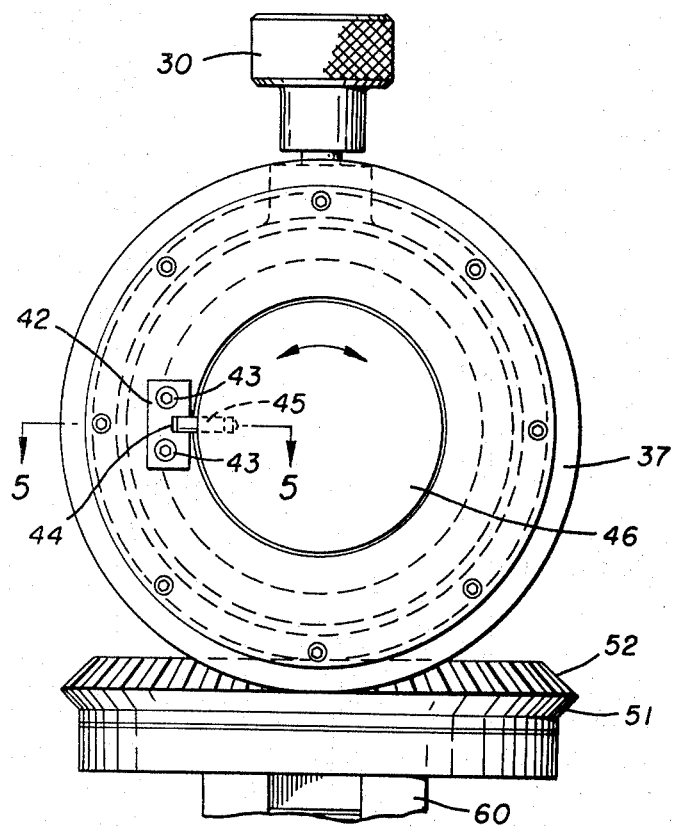
FIG. 3 is a sectional view taken on the lines 3—3 of FIG. 2.

Referring now to FIG. 2, the arm of the inspection machine is indicated by the numeral 20, and it will be seen that around this arm is received a sleeve member 21 that is secured to the arm 20 in fixed relationship therewith so as to be incapable of rotation or shifting relative of the arm 20 once the same has been installed.

Figure 4:
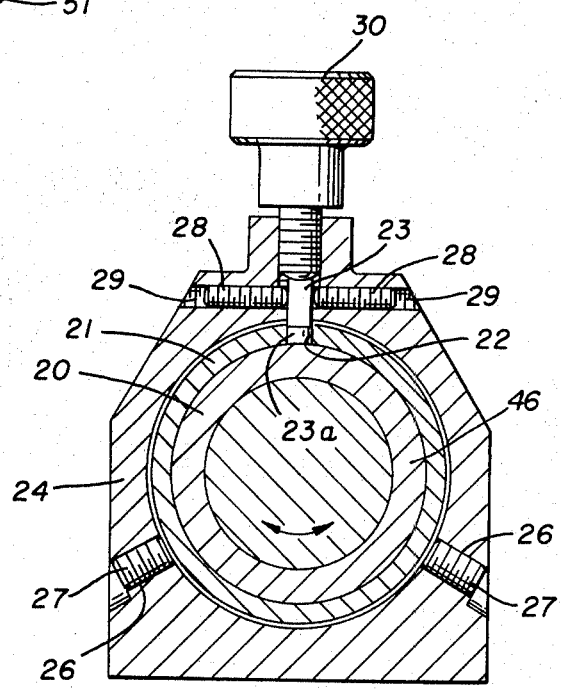
FIG. 4 is an end view of the probe arm with one probe being removed.

The sleeve 21 is provided with an opening 22 within which is received the shank portion 23a of a pin 23, with the pin 23 being preferably rectangular in cross section, as shown in FIG. 4, so as to serve as a rotational locating point of attachment for a housing 24 as will now be described.

In this regard the housing 24, as best shown in FIG. 4, is preferably of generally rectangular configuration and is provided with a series of openings 26,26 through which set screws 27,27 may be inserted for the purpose of locating the housing with respect to the sleeve member 21. Additional set screws 28,28 are received in openings 29,29 and, as will be noted from FIG. 4 of the drawings, bear on opposite sides of the pin 23 so as to permit accurate rotational adjustment of the unit with respect to arm 20 and sleeve 21.

With regard to the locating of the housing with respect to the sleeve, it will be apparent that addition of the second probe unit 17 to the outboard end of the arm 20 will, of course, add weight to the arm and cause some sagging or deflection. Provision of the adjustment screws 27,27 and 28,28 permits the second probe unit 17 to be readily adjusted so as to insure vertical linearity so that the measurements will be accurate.

An adjustable torque handle 30 bears down on the top surface of pin 23, as shown in FIGS. 2 and 4, to firmly lock the unit in place. Aligned openings 31 and 32 are also provided in the housing 24 and sleeve 21, respectively, for lubrication purposes.

Figure 5:
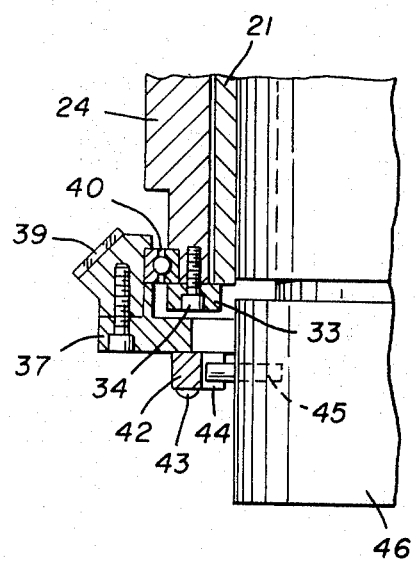
FIG. 5 is a sectional view taken along the lines 5—5 of FIG. 3.

A retaining ring 33 is secured to one end of housing 24 by a plurality of bolts 34,34, as is clearly evident from FIG. 2 of the drawings. A gear retainer ring 37 carries a gear plate 38 having bevel teeth 39 and being associated with the housing 24 through the medium of ball bearing rings 40, as is clearly apparent from FIG. 2 of the drawings. Secured to the gear retainer ring 37 is a driver block 42 that is attached to the gear retainer ring by bolts 43,43 (see FIG. 5). The block 42 is provided with a groove 44 within which may be received a dowel pin 45 which is also received in the rotating portion 46 of arm 20, with this arrangement serving to insure that when the rotating end portion 46 of the inspection arm 20 is rotated, that similar rotation will occur with respect to the gear 38.

Again referring to FIG. 2, a hub 46a is secured as by bolts 47,47 to the lower portion of the housing 24, with the retaining ring 47a being used to keep the ball bearing units 48,48 in position, as shown in FIG. 2, and with the retaining ring being secured by one or more bolts 49,49 as shown in FIG. 2. A second gear retainer ring 50 carries a bevel gear 51 having gear teeth 52 that mesh with the teeth 39 of gear 38, gear plate 51 being connected to the retainer ring 50 through the medium of one or more screws 53,53 (see FIG. 2).

A holder block 60 is secured in known fashion to the gear retainer ring 50 and pivotally supports, as at 61, a holder unit 62 that is pivoted around the pivot point 61 upon the application of pivoting pressure thereto through the medium of thumb screw 64 that operates against stop plate 65, with the stop plate 65 being secured to holder unit 62 through the medium of screw 66.

A probe head 70 pivots around a pivot point formed by clamp screw 71 and is attached to the distal end of holder unit 62. The unit 62 is merely a clamp which holds the indicator attachment 72 in place. The probe unit 17 is attached thereto and will rotate around the axis of rotation of the gear 51. A spring 75 interconnecting holder unit 62 and holder block 60 normally urges the holder unit 62 to the position shown in FIG. 2. As illustrated in FIG. 2, for example, the spring 75 urges the plate 65 into contact with the adjustment screw 64.

The block 60 is also connected to the ring 50 by means of conventional corner screws (not shown).

As illustrated in chain-dotted lines in FIG. 2, the unit 46 is capable of rotation relatively of the fixed arm 20, with the manner of such operation having been described in detail in Applicant's earlier patent mentioned aforesaid.

The second probe unit 16 is shown attached to the unit 46 in chain-dotted lines, and it is to be understood that its function and operation are in no way effected by the attachment of the second probing unit 17. The probes 16 and 17 are operated independently of each other but will enable at least two right angle surfaces to be measured without changing the location of the work piece.

In use or operation of the improved right angle probe, it will first be assumed that the component parts have been assembled to the condition shown in the drawings. It will be understood that the vertical linearity of the second or right angle probe unit will be adjusted by means of the screws 28,28 and 27,27 following which the torque knob 30 will be screwed down to hold the unit in this condition. It is also to be understood that while only 16 is perhaps being used at one time, the other probe will be moving because of the fact that these probes are tied together through the gears and thus move in unison.

Assuming that the inspection operation has been completed by the probe 16, and it is desired to use the probe 17, the only adjustment that is necessary is an adjustment to see that the probe head 17 also sweeps through the desired radius, as shown in FIG. 2, and this can be done by adjusting the probe arm at pivot point 71 and by fine adjusting with the thumb screw 64. When this has been accomplished, the probe can be operated remotely by the control handle and inspection operations conducted in a plane that is at right angles to the plane inspected by the probe 16.

A full and complete description of the invention has been set forth in accordance with the dictates of the Patent Statutes, but it is to be understood that the invention is not intended to be limited to the specific embodiment herein shown. Accordingly, modifications of the invention may be resorted to without departing from the spirit hereof or the scope of the appended claims.

What is claimed is:

1. In combination with an inspection machine for use with a work support surface and which has a base movable with respect to said work support surface, a rigid upright column secured to said base, a bracket mounted for longitudinal movement along said column, and an elongate inspection arm defining an axis and having one end secured to said bracket and projecting normally to said column, the projecting end of said arm carrying a first probe unit adapted to be angularly adjustable with respect to said arm and control means carried on the opposed end of said arm for activating said first probe unit for rotation about the axis of said arm, the improvement comprising;
    A. a housing carried by the projecting end of said inspection arm;
    B. a second probe unit mounted for rotational movement about a second axis perpendicular to the axis of said arm on said housing and adpated to be set at an angle with respect to said second axis of rotation;
    C. gear means interconnecting said first probe and said second probe for driving said second probe.
        1. whereby activation of said control means will cause rotation of said second probe around an axis of rotation that is perpendicular to said arm, with said probe sweeping through a plane that is parallel to said work support surface.

2. The device of claim 1 further characterized by the fact that the diameter of sweep of said second probe unit relatively of said housing is adjustable.

3. The device of claim 1 further characterized by the fact that said housing is rotatably adjustable with respect to the axis of said arm.

* * * * *